United States Patent
Kowalczyk et al.

(10) Patent No.: US 9,581,780 B2
(45) Date of Patent: Feb. 28, 2017

(54) FIBER OPTIC CABLE PACKAGING MANAGEMENT

(75) Inventors: Scott C. Kowalczyk, Savage, MN (US); Oscar Fernando Bran De Leon, Belle Plaine, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 400 days.

(21) Appl. No.: 14/345,101

(22) PCT Filed: Sep. 7, 2012

(86) PCT No.: PCT/US2012/054154
§ 371 (c)(1),
(2), (4) Date: Oct. 17, 2014

(87) PCT Pub. No.: WO2013/039783
PCT Pub. Date: Mar. 21, 2013

(65) Prior Publication Data
US 2015/0063770 A1    Mar. 5, 2015

Related U.S. Application Data (60) Provisional application No. 61/535,818, filed on Sep. 16, 2011, provisional application No. 61/576,647, filed on Dec. 16, 2011.

(51) Int. Cl.
*G02B 6/46* (2006.01)
*G02B 6/44* (2006.01)
*G02B 6/38* (2006.01)

(52) U.S. Cl.
CPC .............. *G02B 6/4446* (2013.01); *G02B 6/443* (2013.01); *G02B 6/445* (2013.01); *G02B 6/4452* (2013.01);
(Continued)

(58) Field of Classification Search
CPC ...................................................... G02B 6/4452
See application file for complete search history.

(56) References Cited

U.S. PATENT DOCUMENTS 4,820,007 A * 4/1989 Ross .................... G02B 6/4416
                                                                174/70 R
4,846,343 A * 7/1989 Rupert ................... B65D 85/04
                                                                206/303

(Continued)

OTHER PUBLICATIONS

International Search Report for International Application No. PCT/US2012/054154 mailed Feb. 27, 2013 (9 pages).

*Primary Examiner* — Michelle R Connelly (57) ABSTRACT

A fiber optic enclosure assembly for enclosing optical fiber connections is disclosed herein. The fiber optic enclosure assembly includes a housing having an interior region, a housing port extending through the housing, a cover surrounding the housing, a cable management recess in the cover, a cover port disposed through a section of the cover, a cable distribution system in the interior region of the housing, and a fiber optic cable. The cover port aligns with the housing port. The fiber optic cable is wrapped about a portion of the cable distribution system, extended through the housing port and the cover port, and wrapped around a cable portion of the cable management recess in the cover. Further, the fiber optic cable has an end portion located within the cable management recess.

26 Claims, 7 Drawing Sheets

(52) U.S. Cl.
CPC ........... *G02B 6/4457* (2013.01); *G02B 6/4466* (2013.01); *G02B 6/3897* (2013.01)

(56) References Cited

U.S. PATENT DOCUMENTS

| | | | |
|---|---|---|---|
| 4,884,863 A | 12/1989 | Throckmorton | |
| 5,109,467 A * | 4/1992 | Hogan | G02B 6/4441 385/135 |
| 5,317,663 A | 5/1994 | Beard et al. | |
| 5,323,479 A * | 6/1994 | Allen | G02B 6/4457 385/135 |
| 5,497,444 A | 3/1996 | Wheeler | |
| 5,689,606 A | 11/1997 | Hassan | |
| 5,717,810 A | 2/1998 | Wheeler | |
| 6,591,051 B2 | 7/2003 | Solheid et al. | |
| 6,745,971 B1 * | 6/2004 | Renzoni | B65H 75/362 242/388.1 |
| 7,346,253 B2 * | 3/2008 | Bloodworth | G02B 6/4453 385/134 |
| 7,376,325 B1 * | 5/2008 | Cloud | G02B 6/445 385/134 |
| 7,416,349 B2 | 8/2008 | Kramer | |
| 7,715,679 B2 | 5/2010 | Kowalczyk et al. | |
| 7,756,379 B2 * | 7/2010 | Kowalczyk | G02B 6/4441 385/135 |
| 7,822,310 B2 * | 10/2010 | Castonguay | G02B 6/4454 174/91 |
| 7,869,682 B2 | 1/2011 | Kowalczyk et al. | |
| 7,889,961 B2 * | 2/2011 | Cote | G02B 6/4452 385/135 |
| 7,894,708 B2 | 2/2011 | Yoo et al. | |
| 8,189,984 B2 | 5/2012 | Kowalczyk et al. | |
| 8,254,740 B2 | 8/2012 | Smith et al. | |
| 8,422,847 B2 | 4/2013 | Kowalczyk et al. | |
| 8,565,572 B2 | 10/2013 | Krampotich et al. | |
| 9,042,700 B2 | 5/2015 | Smith et al. | |
| 2003/0103750 A1 * | 6/2003 | Laporte | G02B 6/445 385/134 |
| 2007/0104447 A1 * | 5/2007 | Allen | G02B 6/4454 385/135 |
| 2009/0304342 A1 * | 12/2009 | Adomeit | G02B 6/445 385/135 |
| 2010/0316346 A1 * | 12/2010 | Krampotich | G02B 6/4455 385/135 |
| 2011/0044599 A1 | 2/2011 | Kowalczyk et al. | |
| 2011/0103761 A1 * | 5/2011 | LeBlanc | G02B 6/4441 385/135 |
| 2011/0262095 A1 * | 10/2011 | Fabrykowski | G02B 6/4466 385/135 |
| 2012/0328257 A1 * | 12/2012 | Kowalczyk | G02B 6/4441 385/135 |
| 2013/0094828 A1 | 4/2013 | Loeffelholz et al. | |
| 2013/0195417 A1 | 8/2013 | Torman et al. | |
| 2014/0023334 A1 * | 1/2014 | Larsson | G02B 6/445 385/135 |
| 2016/0187607 A1 * | 6/2016 | Kowalczyk | G02B 6/4441 385/135 |

* cited by examiner

FIG. 7

FIBER OPTIC CABLE PACKAGING MANAGEMENT

This application is being filed on 14 Mar. 2014, as a US National Stage of PCT International Patent application No. PCT/US2012/054154, filed 7 Sep. 2012 in the name of ADC Telecommunications, Inc., a U.S. national corporation, applicant for the designation of all countries except the U.S., and, Scott C. Kowalczyk, a citizen of the U.S., and Oscar Fernando Bran de León, a citizen of the U.S., applicants for the designation of the U.S. only, and claims priority to U.S. Patent Application Ser. No. 61/535,818 filed on 16 Sep. 2011, and U.S. Patent Application Ser. No. 61/576,647 filed on 16 Dec. 2011and which applications are incorporated herein by reference. To the extent appropriate, a claim of priority is made to each of the above disclosed applications.

TECHNICAL FIELD

The present disclosure relates to fiber optic enclosure assemblies. More specifically, the present disclosure relates to packaging arrangements for fiber optic enclosure assemblies.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure assembly for enclosing optical fiber connections including a housing having an interior region; a housing port extending through the housing; and a cable spool disposed in the interior region of the housing. The cable spool is rotatable relative to the housing to payout a fiber optic cable from the cable spool through the housing port. The fiber optic enclosure assembly also includes a container surrounding the housing. The container defines a storage channel sized and configured to receive excess length of the fiber optic cable that is not wrapped around the cable spool.

Another aspect of the present disclosure relates to a fiber optic enclosure assembly for enclosing optical fiber connections. The fiber optic enclosure assembly includes a housing, a housing port, a cover, a cable management recess, a cover port, a cable distribution system, and fiber optic cable. The housing includes an interior region. The housing port extends through the housing. The cover surrounds the housing. The cable management recess is disposed in the cover. The cover port is disposed through a section of the cover. Further, the cover port aligns with the housing port. The cable distribution system is disposed in the interior region of the housing. The fiber optic cable is wrapped about a portion of the cable distribution system, extended through the housing port and the cover port, and wrapped around a cable portion of the cable management recess in the cover. The fiber optic cable includes an end portion located within the cable management recess.

Another aspect of the present disclosure relates to a fiber optic enclosure assembly for enclosing optical fiber connections. The fiber optic enclosure assembly for enclosing optical fiber connections includes a housing, a housing port, a cover, a cable management recess, a cover port, a cable distribution system, and fiber optic cable. The housing includes an interior region. The housing port extends through the housing. The cover surrounds the housing. The cable management recess is disposed on an exterior surface of the cover. The cover port is disposed through the cover. Further, the cover port aligns with the housing port. The cable distribution system is in the interior region of the housing. The fiber optic cable is wrapped about a portion of the cable distribution system, extended through the housing port and the cover port, and wrapped around a cable portion of the cable management recess in the cover. The fiber optic cable includes an accessible end portion.

A further aspect of the present disclosure relates to a fiber optic enclosure assembly for enclosing optical fiber connections. The fiber optic enclosure assembly for enclosing optical fiber connections includes a housing, a housing port, a cover, a cable management recess, a cover port, a cable distribution system, and fiber optic cable. The housing includes an interior region. The housing port extends through the housing. The cover surrounds the housing. The cable management recess is disposed within an inner cavity of the cover. The cover port is disposed through a section of the inner cavity of the cover. Further, the cover port aligns with the housing port. The cable distribution system is in the interior region of the housing. The fiber optic cable is wrapped about a portion of the cable distribution system, extended through the housing port and the cover port, and wrapped around a cable portion of the cable management recess in the cover. The fiber optic cable includes an end portion located within the cable management recess.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
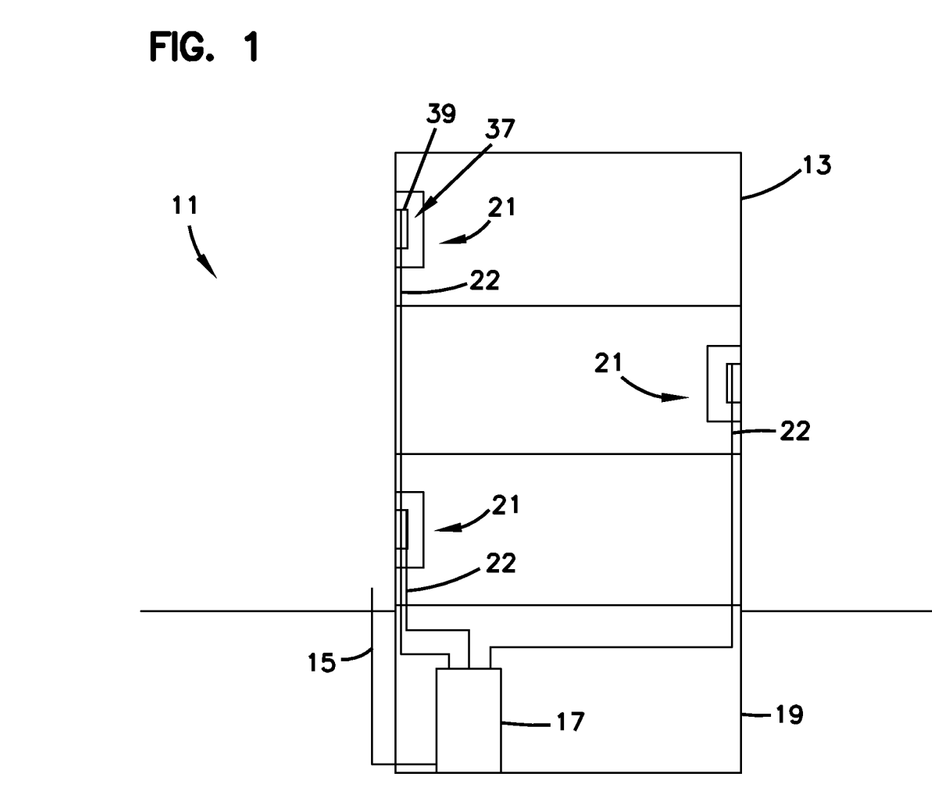
FIG. 1 is a schematic representation of an embodiment of a fiber optic network that includes a fiber optic enclosure having features that are examples of inventive aspects in accordance with the principles of the present disclosure.

Referring now to FIG. 1, a schematic representation of a fiber optic network, generally designated 11, in a facility 13 (e.g., individual residence, apartment, condominium, business, etc.) is shown. The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, or 1-to-32 splitters) that generate a number of individual fibers. In the subject embodiment, and by way of example only, the fiber distribution hub 17 is located on a lower level 19 of the facility 13. Each unit in the facility 13 includes a fiber optic enclosure assembly, generally designated 21, with a subscriber cable 22 extending from each of the fiber optic enclosure assemblies 21 to the fiber distribution hub 17. The subscriber cable 22 extending between the fiber distribution hub 17 and the fiber optic enclosure assembly 21 typically includes multiple optical fibers.

Figure 4:
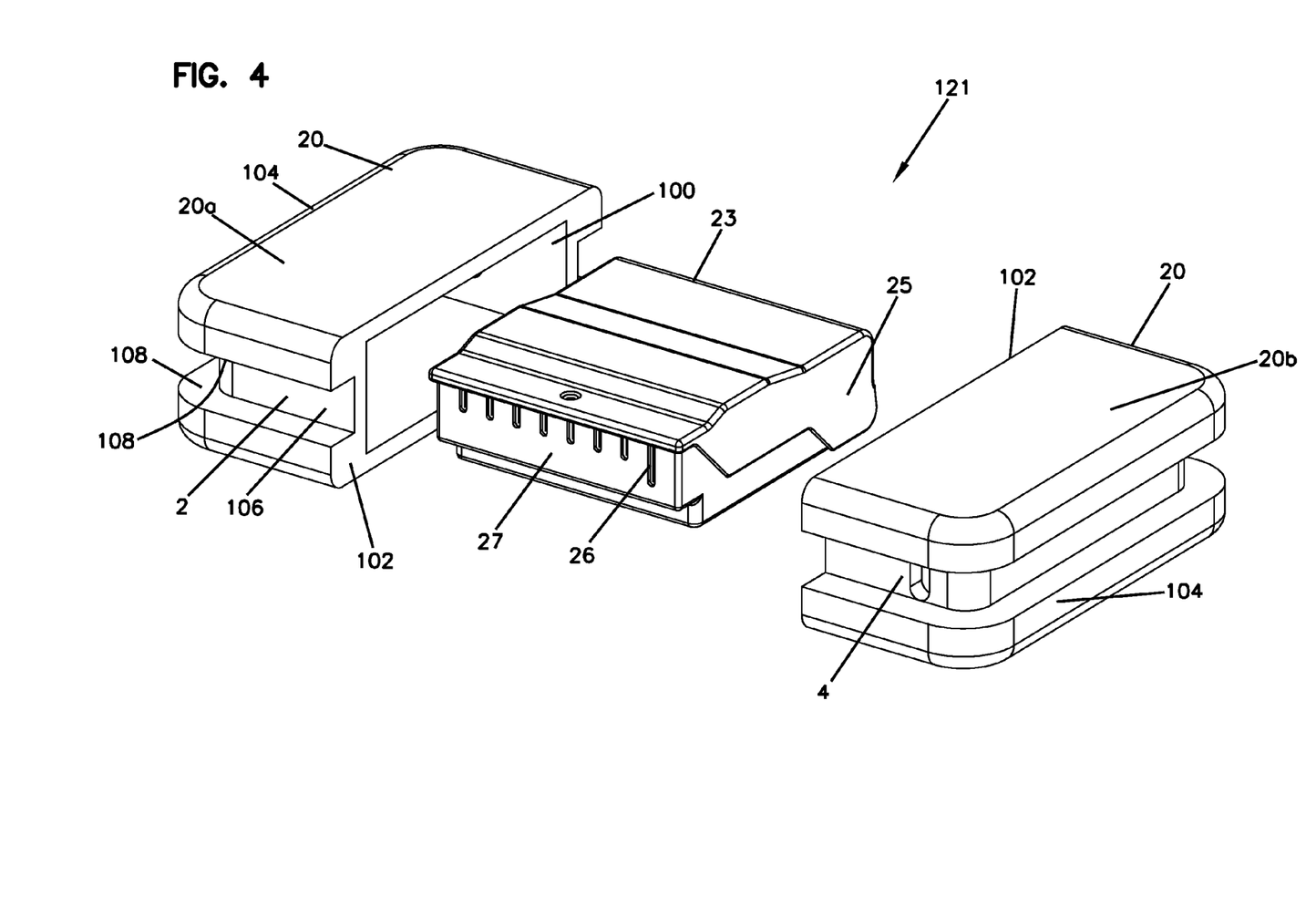
FIG. 4 is an exploded isometric view of an embodiment of the fiber optic enclosure assembly of FIG. 2.
Figure 5:
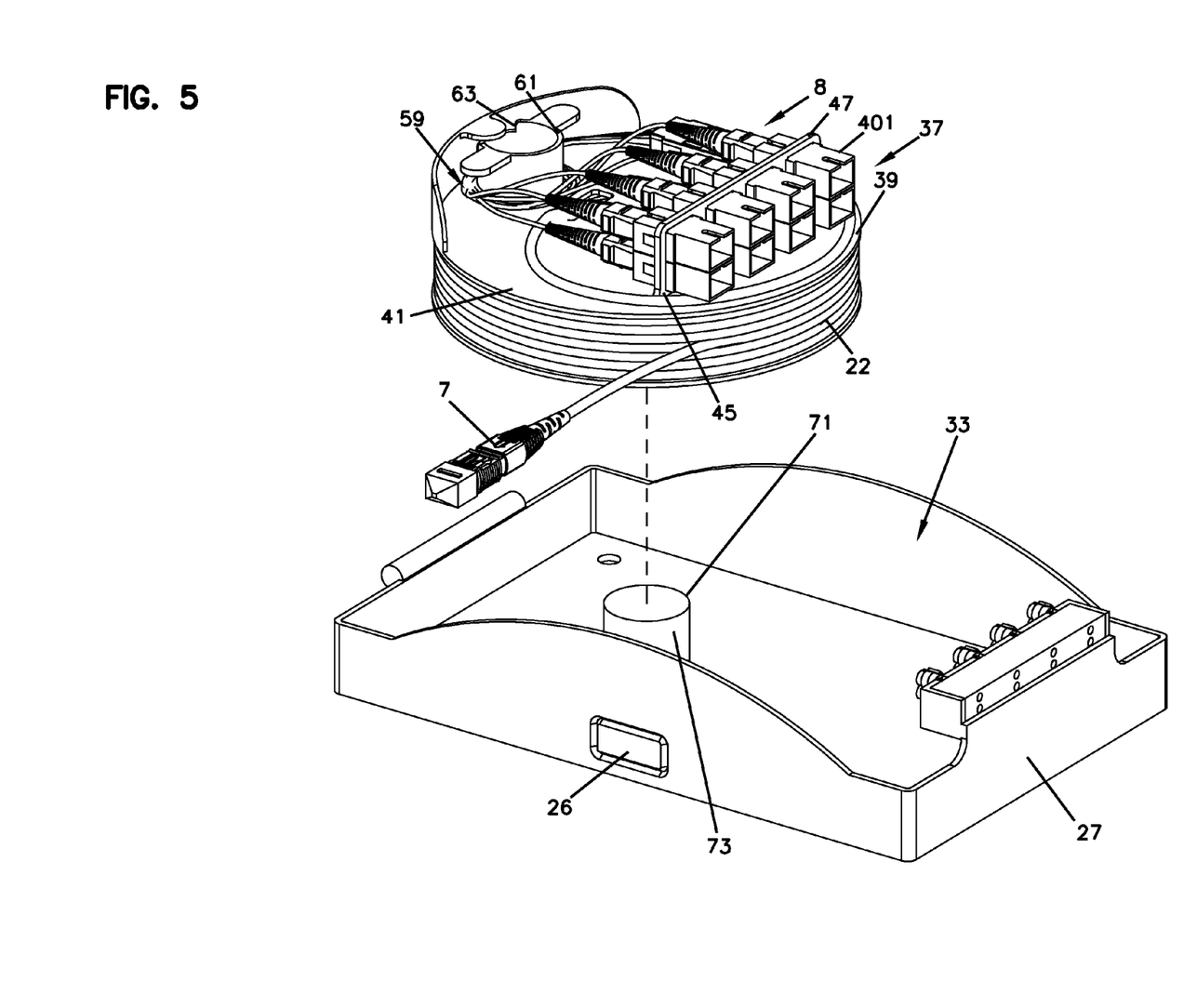
FIG. 5 is an exploded isometric view of an embodiment of a distribution system of the fiber optic enclosure assembly.
Figure 6:
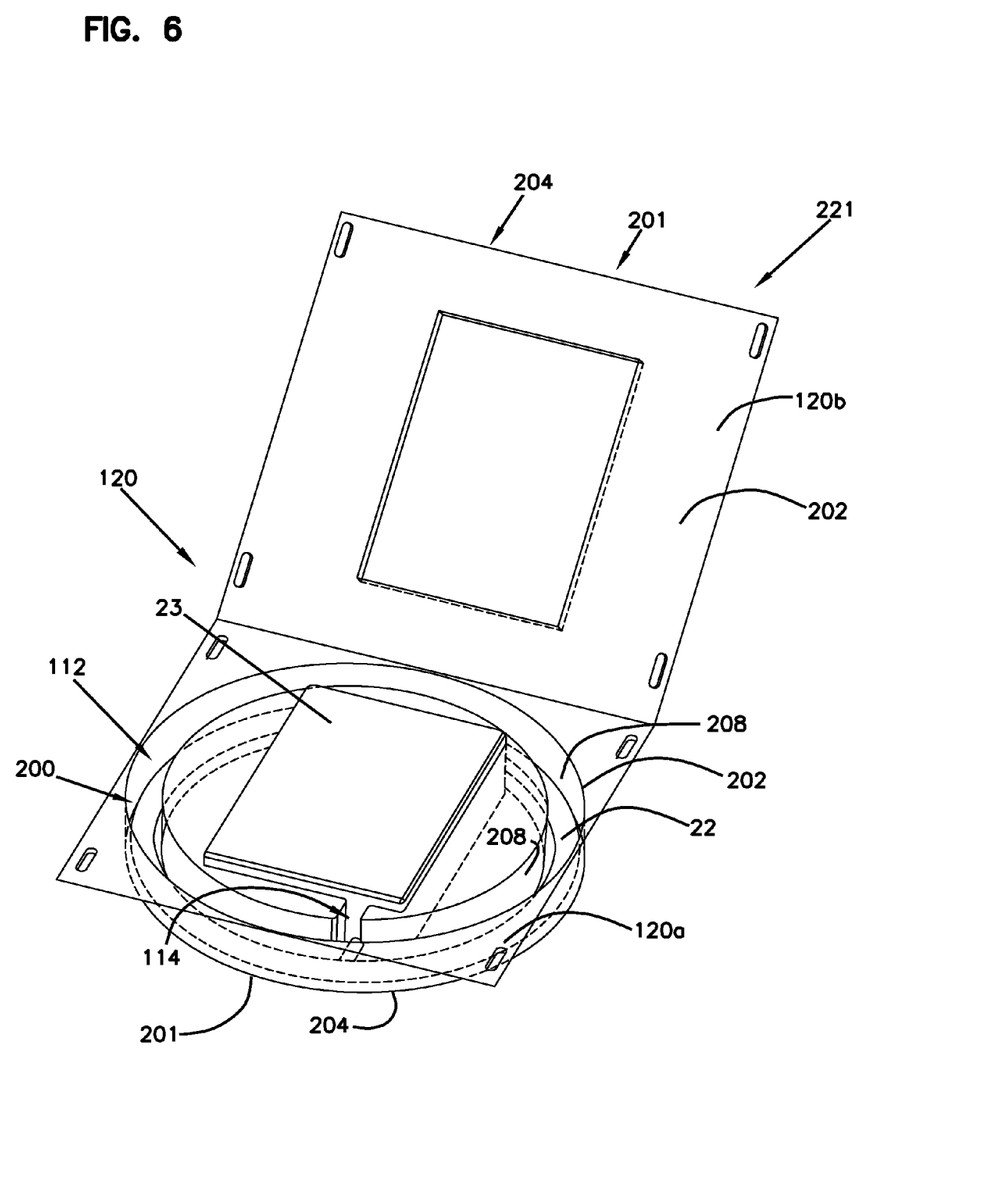
FIG. 6 is an isometric view of an embodiment of a fiber optic enclosure assembly.
Figure 7:
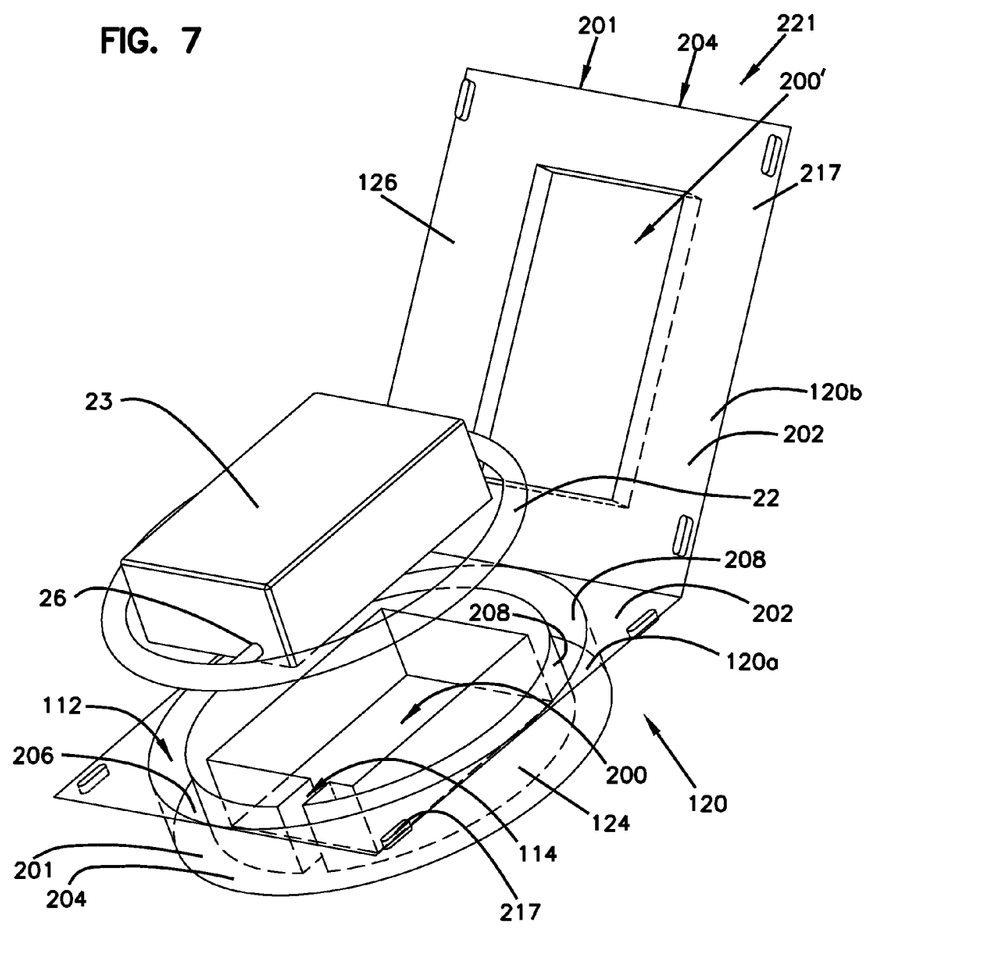
FIG. 7 is an exploded isometric view of an embodiment of the fiber optic enclosure assembly of FIG. 6.

Referring now to FIGS. 2-7, example implementations of the fiber optic enclosure assembly 21 will now be described. FIGS. 2-5 illustrate a first example fiber optic enclosure assembly 121 and FIGS. 6 and 7 illustrate a second example fiber optic enclosure assembly 221. In general, the enclosure assembly 121, 221 includes an enclosure, generally designated 23, housing a rotatable spool, generally designated 37, for storing and deploying the subscriber cable 22. The enclosure 23 is disposed within a covering (i.e., a container) 20, 120 to protect the enclosure 23 (e.g., during shipping). The covering 20, 120 defines a cable management recess (e.g., a storage channel) 2 at which additional length of the subscriber cable 22 may be stored.

The housing 23 defines an interior region 33. In the subject embodiment, the housing 23 includes a top 25 hingedly engaged with a base 27. It will be understood, however, that the scope of the present disclosure is not limited to the top 25 being hingedly engaged the base 27. The housing 23 includes a housing port 26 that extends through the housing 23 to the interior region 33. The housing port 26 is sufficiently large to allow at least one fiber optic cable (e.g., subscriber cable 22) to pass from the interior of the housing 23 to the exterior of the housing 23.

A cable distribution system 8 is disposed in the interior region 33 of the housing 23, as illustrated in FIG. 5. The cable distribution system 8 may include any suitable device or assembly of device that allows for rapid distribution of a length of the subscriber cable 22 stored within the housing 23. In some embodiments, the housing 23 and the cable distribution system 8 form a rapid distribution wall box. Embodiments of cable distribution systems have been described in detail in commonly owned U.S. Pat. Nos. 7,756,379 and 7,894,708 and U.S. application Ser. No. 13/032,337, the disclosures of which are incorporated herein in their entirety by reference.

In the illustrated embodiment, the cable distribution system 8 includes the cable spool 37. The cable spool 37 is disposed in the interior region 33 of the housing 23. The cable spool 37 includes a spooling portion 39, around which the subscriber cable 22 is coiled (shown in FIG. 5). The cable spool 37 has an axial end 41. In the subject embodiment, a termination area is located at the axial end 41 of the cable spool 37. Disposed at the termination area is a termination module, generally designated 45. The termination module 45 of the fiber optic enclosure assembly 21 serves as the dividing line between the incoming fibers and the outgoing fibers.

In certain embodiments, the termination module 45 includes an adapter plate 47. In the subject embodiment, the adapter plate 47 is an L-shaped bracket. The adapter plate 47 defines one or more adapter slots at which one or more adapters may be coupled to the plate 47. It will be understood, however, that the scope of the present disclosure is not limited to the adapter plate 47 being an L-shaped bracket. A first side of the adapter plate 47 is rigidly mounted (i.e., non-rotatable) to the axial end 41 of the cable spool 37 through a plurality of fasteners (e.g., bolts, screws, rivets, etc.) which are inserted through mounting holes in the first side and in connected engagement with the axial end 41 of the cable spool 37.

The adapter slot of the adapter plate 47 is adapted to receive a plurality of adapters, generally designated 401. In the subject embodiment, the adapters 401 are SC-type adapters 401, although it will be understood that the scope of the present disclosure is not limited to the use of SC-type adapters 401. Similar SC-type adapters 401 have been described in detail in commonly owned U.S. Pat. No. 5,317,663, the disclosure of which is incorporated herein by reference.

In an alternate embodiment, the termination module 45 includes a plurality of sliding adapter modules. Similar sliding adapter modules have been described in detail in commonly owned U.S. Pat. Nos. 5,497,444, 5,717,810, 6,591,051 and U.S. Pat. Pub. No. 2007/0025675, the disclosures of which are incorporated herein by reference.

Referring now to FIG. 5, the axial end 41 of the cable spool 37 further defines a slack storage area 59. The slack storage area 59 includes a cable management spool 61 disposed on the axial end 41 of the cable spool 37. The cable management spool 61 is sized such that an outer radius of the cable management spool 61 is larger than the minimum bend radius of the optical fibers so as to avoid attenuation damage to the optical fibers during storage.

The cable management spool 61 and the axial end 41 of the cable spool 37 cooperatively define a cable passage 63 that extends axially through the cable management spool 61 and through the axial end 41 of the cable spool 37. The cable passage 63 allows connectorized ends of incoming optical fibers to pass from the spooling portion 39 of the cable spool 37 to the slack storage area 59. The connectorized ends of the incoming optical fibers are then routed from the slack storage area 59 to the front sides of the adapters 401 in the termination area.

Referring further to FIG. 5, the housing 23 further includes a bearing mount, generally designated 71. In the subject embodiment, the bearing mount 71 is disposed on the base 27 of the housing 23. An outer surface 73 of the bearing mount 71 is adapted for mounting or forming a bearing. In the subject embodiment, the bearing is a needle bearing. However, it will be understood that the scope of the present disclosure is not limited to the bearing being a needle bearing as the bearing could also include a bushing, low-friction coating, etc.

In one embodiment, the bearing is engaged with an inner diameter of a central hole of the cable spool 37. In another embodiment, a rotary plain bearing is formed between the outer surface 73 of the bearing mount 71 and the inner diameter of the central hole of the cable spool 37. In this embodiment, the outer diameter of the bearing mount 71 is sized to fit within an inner diameter of a central hole of the spooling portion 39. The engagement of the bearing mount 71 and the spooling portion 39 of the cable spool 37 allows the cable spool 37 to rotate about the central axis of the bearing mount 71. The bearing allows the cable spool 37 to rotate relative to the housing 23. Because the termination module 45 is mounted on the cable spool 37, the cable spool 37 carries the termination module 45 as the spool is rotated. Thus, the cable spool 37 and the termination module 45 can rotate in unison relative to the housing 23.

Referring now to FIGS. 1 and 5 the subscriber cable 22, which may include multiple optical fibers, is coiled around the spooling portion 39 of the cable spool 37. In order to protect the subscriber cable 22 from attenuation resulting from the coiling of the subscriber cable 22 around the spooling portion 39, the cable spool 37 has an outer circumferential surface having a radius that is greater than the minimum bend radius of the subscriber cable 22. The subscriber cable 22 includes a first end having connectorized ends, which are inserted through the cable passage 63 and connectedly engaged with the first ends of the adapters 401. A second end 7 of the subscriber cable 22 is configured for connectivity with the fiber distribution hub 17. However, as shown in FIG. 1, the length of subscriber cable 22 needed between each of the fiber optic enclosure assemblies 21 in the facility 13 and the fiber distribution hub 17 will vary depending upon the location of each fiber optic enclosure assembly 21 with respect to the fiber distribution hub 17.

The first and second example coverings 20, 120 include a cable management recess (e.g., storage channel) 2, 112 and a cover port 4, 114, respectively. The covering 20, 120 is configured to surround (e.g., encase) the housing 23 when the housing 23 is disposed within the covering 20, 120. In some implementations, the covering 20, 120 is made of a protective and/or shock absorbing material, such as foam and/or rubber. It is understood by a person of skill in the art that any suitable material for protecting the housing 23 containing the cable distribution system 8 may be utilized by the present disclosure.

The first and second example coverings 20, 120 include a first piece 20a, 120a and a second piece 20b, 120b, respectively. At least the first pieces 20a, 120a defines an inner cavity (i.e., or pocket) 100, 200 for receiving at least a portion of the housing 23. At least the first piece 20a, 120a has an open end 102, 202 through which at least the housing 23 may be received in the cavity 100, 200. The first piece 20a, 120a also has a closed end 104, 204 positioned opposite the open end 102, 202. The closed end 104, 204 inhibits access to the cavity 100, 200. In certain implementations, the second piece 20b also has an open end 102 and a closed end 104 (e.g., see FIG. 4). When covering 20, 120 is assembled, the open end 102, 202 of the first piece 20a, 120a abuts the open end 102, 202 of the second piece 20b, 120b such that the housing 23 is fully enclosed by the covering 20, 120.

Figure 2:
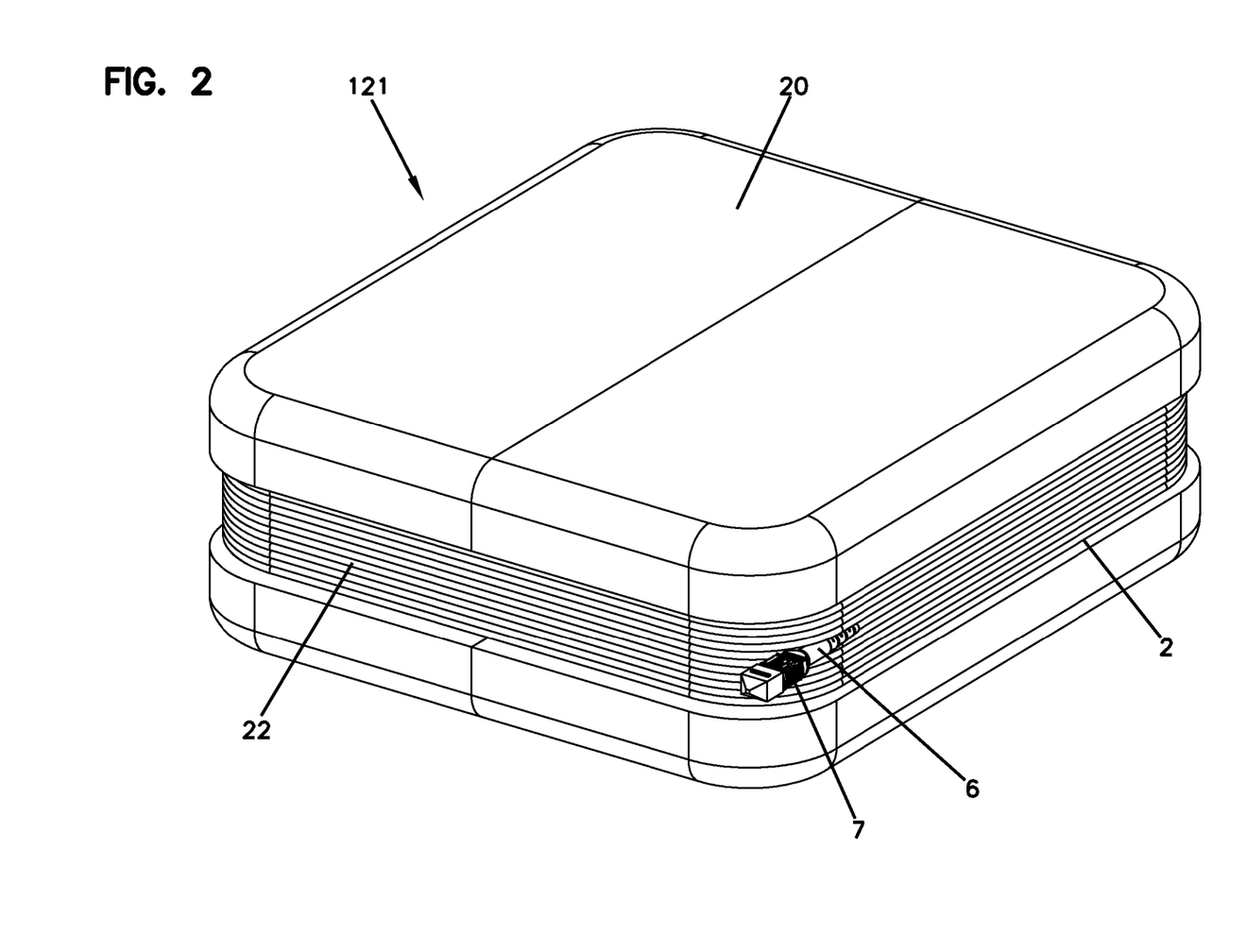
FIG. 2 is an isometric view of an embodiment of the fiber optic enclosure assembly.
Figure 3:
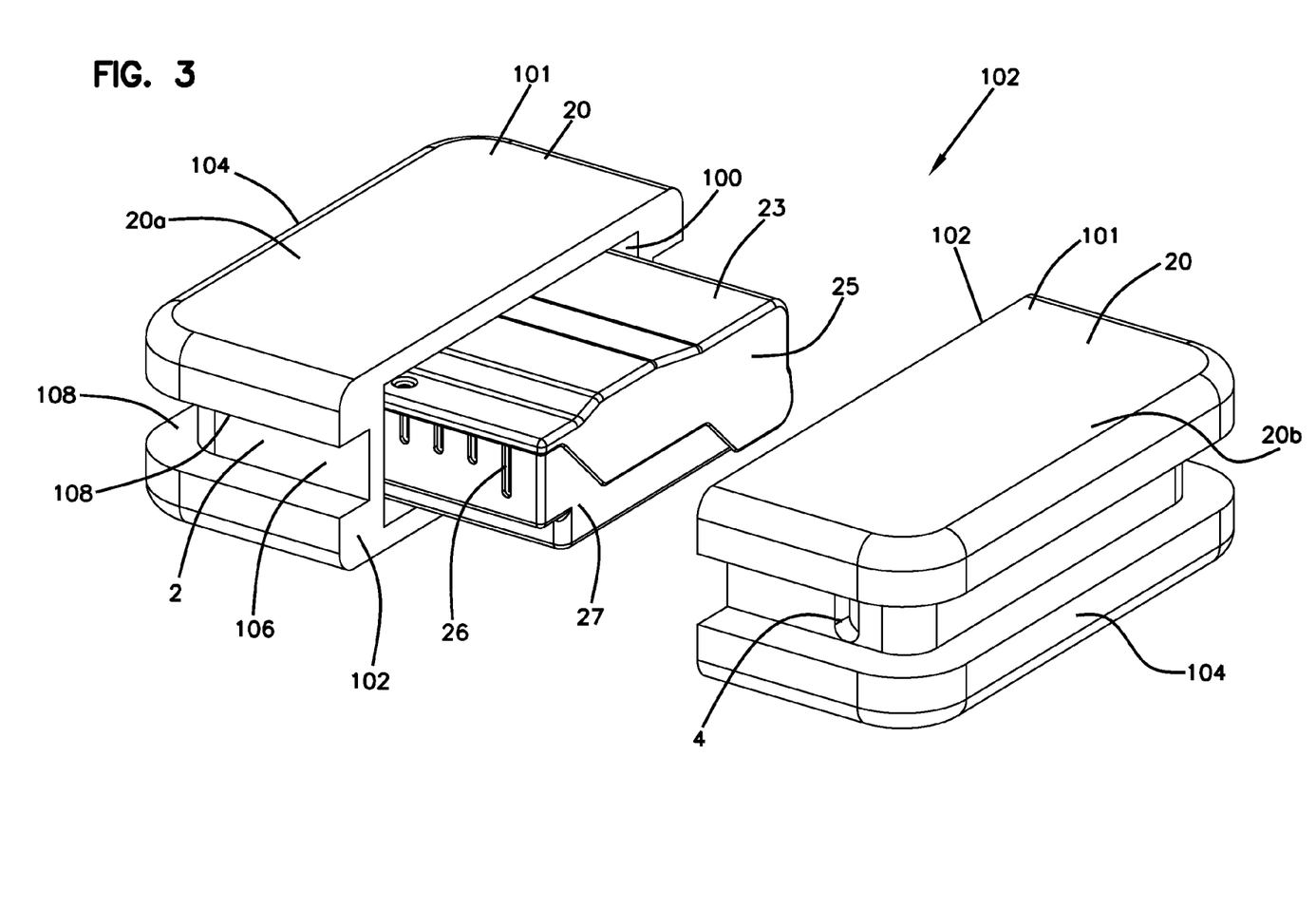
FIG. 3 is an exploded isometric view of an embodiment of the fiber optic enclosure assembly of FIG. 2.

In the depicted embodiment of FIGS. 2-4, the first and second pieces 20a, 20b include half-pieces that each defines a half or generally half of the covering 20. In other implementations, one of the pieces 20a, 20b may form a greater portion of the housing 23 than the other of the pieces 20a, 20b. In the depicted embodiments in FIGS. 6 and 7, the first and second pieces 120a, 120b include a base piece 124 and lid piece 126. The base piece 124 is sized to hold at least a majority of the housing 23. Certain types of lid pieces 126 cover an open top of the base piece 124. Other types of lids 126 partially surround the housing 23.

The first piece 20a, 120a and the second piece 20b, 120b are capable of being moved towards and away from each other to enclose and release the housing 23. In some embodiments, the first piece 20a, 120a and second piece 20b, 120b are separate from each other (e.g., see FIG. 4). In other embodiments, the second piece 20b is moveably attached to the first piece 20a. In the example illustrated in FIGS. 6 and 7, the lid piece 126 is pivotally attached to the base piece 124.

The covering 20, 120 includes an attachment system or mechanism 117, 217 that holds together the first pieces 20a, 120a and the second pieces 20b, 120b to inhibit the pieces 20a, 120a and 20b, 120b from separating or opening away from one another. In the example shown in FIG. 2, the attachment mechanism 117 includes wrapping a section of the subscriber cable 22 around the covering 20. For example, the cable 22 is wrapped within the recess 2 that extends around a periphery of the covering 20. The cable 22 inhibits the first piece 20a of the first example covering 20 from sliding away from the second piece 20b of the covering 20. In the example shown in FIG. 7, the attachment mechanism 217 includes a reciprocal male/female engagement system (e.g., a friction-fit tab and recess). In other example implementations, the attachment mechanism may include a hook and loop system, an adhesive system, a latching system, fasteners (e.g., screws or bolts), etc.

The recess 2, 112 may be located on or at any suitable side or section of the covering 20, 120 for holding and/or retaining the subscriber cable 22 on the covering 20, 120. In various embodiments, the recess 2, 112 may be located inside or outside of the covering 20, 120. In some embodiments, the recess 2 is disposed on an exterior surface 101 of the cover 20 as illustrated in FIGS. 2-4. In other embodiments, the recess 112 is disposed within the inner cavity 200 of the cover 120 as illustrated in FIGS. 6 and 7. In some embodiments, the recess 2 extends across the first piece 20a and the second piece 20b (see FIG. 4). In other embodiments, the recess 112 is disposed on or in only the first piece 120a or only the second piece 120b (see FIG. 6).

The recess 2, 112 has a transverse cross-sectional profile having a bottom wall 106, 206 and two opposing side walls 108, 208. In the first illustrated embodiment, the recess 2 extends around only a portion of the perimeter of each piece 20a, 20b. For example, the recess 2 extends from the open end 102 to the closed end 104 and then returns back to the open end 102. For the segment of the recess 2 defined by the first piece 20a, the first piece 20a defines the entire transverse cross-sectional profile of the recess 2. For the segment of the recess 2 defined by the second piece 20b, the second piece 20b defines the entire transverse cross-sectional profile of the recess 2.

In the second illustrated embodiment, the recess 112 is located within the inner cavity 200. For example, the recess 112 may be a circular recess located on the open end 202 of the first piece 120a or the second piece 120b. In some embodiments, the recess 112 is located within the inner cavity 200 and surrounds the cavity 200 in which the housing 23 is disposed. In these embodiments, the cover port 114 extends through a section of the inner cavity 200 providing a space for the subscriber cable 22 to travel from the housing 23 to the recess 112.

The cover port 4, 114 extends through a section of the covering 20, 120. In some embodiments, the cover port 4 extends from the inner cavity 100 of the covering 20 to the exterior surface 101 of the covering 20. In other embodiments, the cover port 114 extends through a portion, section, or part of the covering 120 without reaching the exterior surface 201 of the covering 120. For example, the cover port 114 may connect an area of the inner cavity 200 holding the housing 23 to the recess 2 disposed within the interior of the covering 120 as illustrated in FIGS. 6-7.

The cover port 4, 114 is configured to allow for at least one fiber optic cable 22 to pass through the cover port 4, 114. The cover port 4, 114 on the covering 20, 120 aligns with the housing port 26 when the housing 23 is disposed within the covering 20, 120. The alignment of the cover port 4, 114 and the housing port 26 are configured to create an aperture that allows for at least one fiber optic cable 22 to pass from the interior 33 of the housing 23 to the recess 2, 112 of the covering 20, 120. In some embodiments, the cover port 4 is defined through the bottom surface 106 of the cable management recess 2 (see FIG. 4). In other embodiments, the cover port 114 is defined through one or both side surface 208 of the cable management recess 112 (see FIG. 7).

The cable management recess 2, 112 includes a cable storage portion around which the fiber optic cable 22 may be wrapped. This cable storage portion allows the cable management recess 2, 112 to store a predetermined length or less of the fiber optic cable 22 on or in the covering 20, 120. The cable portion is sized such that the cable portion includes a curvature that is larger than the minimum bend radius of the optical fibers so as to avoid attenuation damage to the optical fibers during storage.

Further, the cable storage portion leaves an end 7 (FIG. 5) of the subscriber cable 22 exposed within the recess 2, 112. The end 7 of the subscriber cable 22 may be accessible to the user or installer of the fiber optic enclosure assembly 21, 121 without removing the housing 23 from the covering 20, 120. In some embodiments, the accessible end 7 of the fiber optic cable 22 is accessible by the user or operator without having to open up the covering 20. In other embodiments, the end 7 of the fiber optic cable 22 is accessible after opening the covering 120 and exposing the recess 112. The end 7 of the subscriber cable 22 may be a connectorized end.

In some embodiments, the predetermined length of fiber optic cable or subscriber cable 22 stored on or in the covering 20, 120 is an installation length, which is sufficiently long enough to extend from the mounting location of the fiber optic enclosure assembly 21, 121 to the fiber distribution hub 17 (FIG. 1). In some embodiments, the predetermined length of fiber optic cable 22 is only a portion of the installation length. In other embodiments, the predetermined length is the installation length plus an excess length, which is the length of subscriber cable 22 remaining on the cable spool 37 after the installation length has been unwound from the cable management recess 2, 112.

In one embodiment, the predetermined length is greater than or equal to about 20 feet. In another embodiment, the predetermined length of subscriber cable 22 is greater than or equal to about 50 feet. In another embodiment, the predetermined length of subscriber cable 22 is greater than or equal to about 80 feet. In a further embodiment, the predetermined length of subscriber cable 22 is greater than or equal to about 100 feet. In an additional embodiment, the predetermined length of subscriber cable 22 is greater than or equal to about 150 feet. In certain embodiments, the length is in the range of 20-500 feet.

In some embodiments, as illustrated in FIGS. 2-4, the cable management recess 2 surrounds the covering 20 (e.g., extends about a perimeter of the covering). In other embodiments, not illustrated, the recess 2 may be located entirely on one side on the external surface 101 of the covering 20 and includes a spooling or cable portion (e.g., a circular pocket defined in a major side of the covering 20 in which the stored cable is coiled) for holding the extra length of cable within the center of the cable management recess 2. In some embodiments, the first and second pieces 20*a*, 20*b* of the covering 20 include half-pieces of the recess 2 and spooling portion that each defines a half or generally half of the recess 2 and spooling portion. In other embodiments, when the first and second pieces 20*a*, 20*b* include half-pieces of the recess 2 and spooling portion, the cable is wrapped about the covering 20 within the recess 2 on a portion of each of the first and second pieces 20*a*, 20*b*, thereby preventing the pieces 20*a*, 20*b* from being separated from one another.

In further embodiments, as illustrated in FIGS. 6-7, the cable management recess 112 is disposed within the inner cavity 200 of the covering 120. In some embodiments, the recess 112 is a circular recess that extends around the outer area of the housing 23 within the inner cavity 200 of the covering 120. In other embodiments, the recess 112 is utilizes another shape for storing subscriber cable 22 provided that the recess 112 provides bend radius protection for the optical fibers 22 to avoid attenuation damage to the optical fibers 22 during storage. In other embodiments, the recess 112 is located adjacent to or near the housing 23 within cavity 200 and does not surround the housing 23. In some embodiments, the first piece 120*a* or the second piece 120*b* of the covering 120 entirely contains the recess 112 and housing 23 within the inner cavity 200. In other embodiments, the first and second pieces 120*a*, 120*b* cooperate to define the recess 112 and/or the pocket 200 within which the housing 23 is retained.

In some embodiments, the covering 20, 120 further includes a retention device 6. The retention device 6 selectively attaches the fiber optic cable or subscriber cable 22 and/or the end 7 (such as a connectorized end) of the fiber optic cable 22 to the covering 20, 120. Non-limiting examples of the retention device 6 include a hook, snap, clip, strap, band or any other suitable device for selectively attaching the fiber optic cable 22 of the fiber optic cable 22 to the covering 20, 120. For example, the retention device 6 may attach the fiber optic cable 22 to the covering 20, 120 during storage of the fiber optic cable 22. A user opens, unfastens, unhinges, and/or unhooks the retention device 6 to allow the fiber optic cable 22 to be unwound from the covering 20, 120 prior to deploying/paying out the fiber optic cable 22.

In some embodiments, the covering 20, 120 is surrounded with plastic wrap. The plastic wrap may further protect and insulate the housing 23, the cable distribution system 8, and the excess length of subscriber cable 22. The plastic wrap also may help to maintain the fiber optic cable 22 within the cable management recess 2. In some embodiments, the plastic wrap is removed or unwrapped prior to use (e.g., deployment or pay out) of the subscriber cable 22.

The fiber optic enclosure assembly 21 provides dual functionality by serving as a storage location for the subscriber cable 22 and by selectively paying out a desired length of the subscriber cable 22. One example method of storing a subscriber cable 22 in a fiber optic assembly 21, 121 includes coiling a first length of the subscriber cable 22 around a cable spool 37 disposed within a housing 23. The length of subscriber cable 22 may include a portion of the installation length (i.e., the length of cable 22 that extends between the housing 23 and the FDH 17). In certain implementations, the length also includes a second or an excess length, which is the length of subscriber cable 22 remaining on the cable spool 37 after the installation length has been paid out. In one embodiment, a second length, or the excess length, of subscriber cable 22 is stored around the cable spool 37 after the first length of subscriber cable 22 has been paid out. If the first length of subscriber cable 22 is greater than the installation length of subscriber cable 22, the second length, or excess length, remains stored around the cable spool 37 after installation.

In one embodiment, the first length is greater than or equal to about 100 feet. In another embodiment, the first length of subscriber cable 22 is greater than or equal to about 200 feet. In another embodiment, the first length of subscriber cable 22 is greater than or equal to about 300 feet. In another embodiment, the first length of subscriber cable 22 is greater than or equal to about 400 feet. In another embodiment, the first length of subscriber cable 22 is greater than or equal to about 500 feet. In another embodiment, the first length of subscriber cable 22 is in the range of about 100 to about 2,000 feet. In another embodiment, the first length of subscriber cable 22 is in the range of about 100 to about 1,500 feet. In another embodiment, the first length of subscriber cable 22 is in the range of about 500 to about 1,500 feet. In a preferred embodiment, the first length of subscriber cable 22, which is coiled around the cable spool 37, is in the range of 100 to 500 feet.

One or more connectorized ends of the subscriber cable 22 may be plugged into the first ends of the adapters 401 fixedly connected to the spool 37. Accordingly, the connectorized ends rotate in unison with the cable spool 37 when the cable spool 37 is rotated relative to the housing 23. The housing 23 is closed to protect the adapters 401, subscriber cable 22, and/or connectorized ends. For example, the lid 25 may be moved to a closed position. In certain implementations, the lid 25 may be locked or otherwise held in the closed position.

The housing 23 may be packaged within a covering 20, 120. In some implementations, a first covering piece 20a is slid over a first end of the housing 23 and a second covering piece 20b is slid over a second end of the housing 23 so that the two pieces 20a, 20b cooperate to surround the housing 23. The free end 7 of the subscriber cable 22 may be fed through the cable port 4 of the covering 20. Additional excess length of the subscriber cable 22 is wrapped around the covering 20, thereby holding the pieces 20a, 20b together. For example, the subscriber cable 22 may be wound within a channel or recess 2 defined in a periphery of the covering 20. The free end 7 of the subscriber cable 22 may be secured to the covering 20 (e.g., within the channel or recess 2).

In other implementations, the housing 23 is placed within a pocket or cavity 200 within a base 124 of a covering 120. The free end 7 of the subscriber cable 22 is routed through a port 114 in the cavity 200 to an internal channel 112 defined within the base 124. In certain implementations, the internal channel 112 is ring-shaped. The subscriber cable 22 is wound within the channel 112. A lid 126 of the covering 120 may be moved to the closed position relative to the base 124 to inhibit access to the subscriber cable 22 and housing 23. The lid 126 may be locked or latched in the closed position.

One example method of paying out the subscriber cable 22 from the fiber optic enclosure assembly 21, 121 will now be described. The example method accounts for the varying lengths of subscriber cable 22 needed between the fiber optic enclosure assembly 21, 121 and the fiber distribution hub 17. It is understood by a person of skill in the art that other methods for selective payout of the subscriber cable 22 may be utilized with the present disclosure.

A predetermined length of the fiber optic cable 22 is stored in the cable management recess 2, 112 of the covering 20, 120. This predetermined length is unwound from the recess 2, 112 (e.g., by accessing the end 7 of the fiber optic cable 22) prior to paying out the fiber optic cable 22 from the housing 23. In some implementations, the cable 22 is unwound from the exterior surface 101 of the covering 20. In other implementations, the cable 22 is unwound from an interior of the covering 120. In some embodiments, if plastic wrap is on the covering 20, 120, the plastic wrap is removed before accessing the recess 2, 112.

A housing 23 is removed from the covering 20, 120. For example, in some implementations, the first and second pieces 20a, 20b of the covering 20 are slid in opposite directions to remove the covering 20 from the housing 23. In other implementations, the lid 126 may be moved relative to the base 124 towards an open position. In certain implementations, attachment mechanisms are released prior to moving the covering pieces 20a, 20b, 120a, 120b. The housing 23 is mounted to a wall or other surface at a desired deployment location (e.g., on a floor of an MDU).

A user accesses the free end 7 of the subscriber cable 22 and pulls the free end 7 to unwind the subscriber cable 22 from the spool 37 within the housing 23. The spool 37 rotates on the bearing mount 71 within the housing 23 when the user pulls on the free end 7 of the cable 22. Since the adapters 401 are fixedly mounted to the cable spool 37, the adapters 401 rotate with the cable spool 37 as the cable 22 is being paid out. Accordingly, the connectorized ends of the subscriber cable 22 that are plugged into the adapters 401 rotate with the cable spool 37. Thereby, the subscriber cable 22 may be deployed without the first end of the subscriber cable 22 being disconnected from the termination module 45. The free end 7 of the subscriber cable 22 is routed to the FDH 17 or other optical signal source at which the free end 7 is connected to an optical network.

Once the desired length of subscriber cable 22 has been paid out, the rotation of the cable spool 37 is ceased. At this point, the position of the cable spool 37 can be fixed such that it does not rotate relative to the housing 23. In one embodiment, a pin is inserted through an opening in the axial end 41 of the cable spool 37 and through a corresponding opening in the base 27 of the housing 23 to fix the position of the cable spool 37 with respect to the housing 23. It will be understood, however, that the scope of the present disclosure is not limited to the use of a pin to fix the position of the cable spool 37 with respect to housing 23.

Subsequent to paying out the subscriber cable 22, one or more additional optical fibers (e.g., distribution cable fibers) may be routed to the housing 23 for connection to the subscriber cable 22, thereby connecting the additional optical fibers to the optical network. To connect a distribution fiber to the optical network, a user accesses the interior of the housing 23 (e.g., by opening the cover lid 25 of the housing 23). The user plugs a connectorized end of the distribution fiber into the second end of one of the adapters 401 to optically couple the distribution fiber to the subscriber cable 22. The subscriber cable 22 optically couples the distribution fiber to the optical network (via a feeder cable 15).

An alternate method of selectively paying-out subscriber cable 22 from the fiber optic enclosure assembly 21, 121 will now be described. With the fiber optic enclosure assembly 21, 121 positioned near the fiber distribution hub 17, the second end 7 of the subscriber cable 22 is unwound from the cable spool 37 after the predetermined length of subscriber cable 22 has been unwound for the cable management recess 2, 112 of the cover 20, 120. In one embodiment, the second end 7 is optically connected to the fiber distribution hub 17. With the second end 7 of the subscriber cable 22 optically connected to the fiber distribution hub 17 and the first end of the subscriber cable 22 connected to the termination module 45, the fiber optic enclosure assembly 21, 121 is transported away from the fiber distribution hub 17.

In one embodiment, the fiber optic enclosure assembly 21 is carried away from the fiber distribution hub 17 by an installer. In another embodiment, the fiber optic enclosure assembly 21 is transported away from the fiber distribution hub 17 in a wheeled cart (e.g., dolly, 4-wheeled cart, etc.). In a preferred embodiment, the fiber optic enclosure is disposed in a packaging enclosure (e.g., covering 20 or covering 120) during transport. As the fiber optic enclosure assembly 21, 121 is transported away from the fiber distribution hub 17, the subscriber cable 22 unwinds from the cable spool 37 causing the cable spool 37 to rotate within the interior region 33 of the housing 23, which is disposed in the packaging enclosure 20, 120. When the fiber optic enclosure assembly 21, 121 has been transported to its mounting location, the fiber optic enclosure assembly 21, 121 is removed from the packaging enclosure 20, 120 and mounted to the mounting location. The cable spool 37 can be fixed in position relative to the housing 23 to prevent inadvertent rotation of the cable spool 37.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A fiber optic enclosure assembly for enclosing optical fiber connections comprising:
    a housing having an interior region;
    a housing port extending through the housing;
    a cover surrounding the housing;
    a cable management recess in the cover;
    a cover port disposed through a section of the cover, the cover port aligns with the housing port;
    a cable distribution system in the interior region of the housing; and
    a fiber optic cable wrapped about a portion of the cable distribution system, extended through the housing port and the cover port, and wrapped around a cable portion of the cable management recess in the cover, the fiber optic cable having an end portion located within the cable management recess.

2. The fiber optic enclosure assembly of claim 1, wherein the cable distribution system comprises:
    a cable spool disposed in the interior region of the housing, the cable spool selectively rotates within the housing about an axis; and
    wherein the portion is a spooling portion of the cable spool.

3. The fiber optic enclosure assembly of claim 1, wherein the end portion includes a connectorized end.

4. The fiber optic enclosure assembly of claim 1, wherein the end portion is accessible from outside of the cover while the cover is surrounding the housing.

5. The fiber optic enclosure assembly of claim 1, wherein the cable management recess is disposed on an exterior portion of the cover, and wherein the cover comprises a first piece and a separate second piece.

6. The fiber optic enclosure assembly of claim 1, wherein the cable management recess is disposed within an interior portion of the cover, and wherein the cover comprises a first piece and a second piece moveably attached to the first piece.

7. The fiber optic enclosure assembly of claim 1, wherein the cover is a foam material.

8. The fiber optic enclosure assembly of claim 1, wherein a predetermined length of the fiber optic cable is wrapped around the cable portion of the cable management recess in the cover, wherein the predetermined length is an installation length.

9. The fiber optic enclosure assembly of claim 1, wherein the housing and the cable distribution system are a rapid distribution wall box.

10. The fiber optic enclosure assembly of claim 1, wherein the section of the cover port extends from an inner cavity of the cover to an exterior surface of the cover.

11. The fiber optic enclosure assembly of claim 1, wherein the section of the cover port extends through a part of an inner cavity of the cover.

12. A fiber optic enclosure assembly for enclosing optical fiber connections comprising:
    a housing having an interior region;
    a housing port extending through the housing;
    a cover surrounding the housing;
    a cable management recess disposed on an exterior surface of the cover;
    a cover port disposed through the cover, the cover port aligns with the housing port;
    a cable distribution system in the interior region of the housing; and
    a fiber optic cable wrapped about a portion of the cable distribution system, extended through the housing port and the cover port, and wrapped around a cable portion of the cable management recess in the cover, the fiber optic cable having an accessible end portion.

13. The fiber optic enclosure assembly of claim 12, wherein the cable management recess surrounds the cover, and wherein the cover comprises a first piece and a separate second piece.

14. The fiber optic enclosure assembly of claim 12, wherein the cover further comprises a retention device that selectively attaches the fiber optic cable to the cover.

15. The fiber optic enclosure assembly of claim 12, wherein a predetermined length of the fiber optic cable is wrapped around the cable portion of the cable management recess in the cover, wherein the predetermined length is an installation length.

16. The fiber optic enclosure assembly of claim 12, further comprising a plastic wrap that surrounds the cover and the fiber optic cable wrapped around the cable portion of the cable management recess in the cover.

17. A fiber optic enclosure assembly for enclosing optical fiber connections comprising:
    a housing having an interior region;
    a housing port extending through the housing;
    a cover surrounding the housing;
    a cable management recess disposed in an inner cavity of the cover;
    a cover port disposed through a section of the inner cavity of the cover, the cover port aligns with the housing port;
    a cable distribution system in the interior region of the housing; and
    a fiber optic cable wrapped about a portion of the cable distribution system, extended through the housing port and the cover port, and wrapped around a cable portion of the cable management recess in the cover, the fiber optic cable having an end portion located within the cable management recess.

18. The fiber optic enclosure assembly of claim 17, wherein the cover comprises a first piece and a second piece moveably attached to the first piece.

19. The fiber optic enclosure assembly of claim 18, wherein the cover is maintained in a closed position via an attachment mechanism.

20. The fiber optic enclosure assembly of claim 17, wherein the cable management recess is a circular recess that surrounds the housing.

21. A fiber optic enclosure assembly for enclosing optical fiber connections comprising:
   a housing having an interior region;
   a housing port extending through the housing;
   a cable spool disposed in the interior region of the housing, the cable spool being rotatable relative to the housing to payout a fiber optic cable from the cable spool through the housing port;
   a container surrounding the housing, the container defining a storage channel sized and configured to receive excess length of the fiber optic cable that is not wrapped around the cable spool.

22. The fiber optic enclosure assembly of claim 21, wherein the storage channel is defined within an interior of the container.

23. The fiber optic enclosure assembly of claim 22, wherein the container includes a box and a lid, wherein the box defines a pocket sized and shaped to receive the housing and wherein the storage channel surrounds the pocket.

24. The fiber optic enclosure assembly of claim 23, wherein the lid defines a depression sized and shaped to receive a portion of the housing when the lid is closed on the box.

25. The fiber optic enclosure assembly of claim 21, wherein the storage channel
   is defined along an exterior of the container.

26. The fiber optic enclosure assembly of claim 25, wherein the container includes a first foam piece and a second foam piece that cooperate to surround the housing.

* * * * *

UNITED STATES PATENT AND TRADEMARK OFFICE
CERTIFICATE OF CORRECTION

PATENT NO. : 9,581,780 B2  
APPLICATION NO. : 14/345101  
DATED : February 28, 2017  
INVENTOR(S) : Kowalczyk et al.

It is certified that error appears in the above-identified patent and that said Letters Patent is hereby corrected as shown below:

In the Specification

Column 1, Line 14: "on 16 Dec. 2011and which" should read --on 16 Dec. 2011 and which--

Signed and Sealed this  
Twenty-sixth Day of June, 2018

Andrei Iancu  
*Director of the United States Patent and Trademark Office*